(12) United States Patent
Hur et al.

(10) Patent No.: US 6,201,947 B1
(45) Date of Patent: Mar. 13, 2001

(54) MULTIPURPOSE LEARNING DEVICE

(75) Inventors: Jeong Hur; Il-dong Kang, both of Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/116,485

(22) Filed: Jul. 16, 1998

(30) Foreign Application Priority Data

Jul. 16, 1997 (KR) .................................................. 97-32980

(51) Int. Cl.[7] ...................................................... G09B 5/00
(52) U.S. Cl. ........................... 434/317; 434/178; 434/308; 434/309; 434/169; 434/307 R; 434/365; 345/901; 369/68; 369/69
(58) Field of Search ..................................... 434/317, 178, 434/308, 309, 169, 307 R, 365; 345/901; 462/66; 369/31, 63, 68, 69

(56) References Cited

U.S. PATENT DOCUMENTS

| 5,174,759 | | 12/1992 | Preston et al. . | |
| 5,575,659 | * | 11/1996 | King et al. ...................... | 434/467 X |
| 5,749,735 | | 5/1998 | Redford et al. . | |
| 5,803,748 | * | 9/1998 | Maddrell et al. ................ | 434/317 X |
| 5,829,985 | * | 11/1998 | Campanella ...................... | 434/317 X |
| 5,851,119 | * | 12/1998 | Sharpe, III et al. ............. | 434/317 X |
| 5,897,324 | * | 4/1999 | Tan .................................. | 434/317 X |
| 6,021,306 | * | 2/2000 | McTaggert ....................... | 434/317 X |

* cited by examiner

*Primary Examiner*—Valencia Martin-Wallace
*Assistant Examiner*—Chanda Harris
(74) *Attorney, Agent, or Firm*—Robert E. Bushnell, Esq.

(57) ABSTRACT

A multipurpose learning device having a picture book including a plurality of pages, wherein the pages turned in a top-to-bottom hinged direction instead of a side-to-side hinged direction, a memory unit having audio and video data stored therein, the memory unit being detachably connected to a touch board. A surface of the touch board is declined to a predetermined angle for enabling a user to easily position an electronic pen perpendicular to the touch board. Each sheet of the picture book includes a blank page and a picture page and picture information corresponding to a picture on one of the pages is displayed on a host device, such as a television. A user moves the electronic pen over a blank page which is positioned over the touch board, and a cursor is displayed on the host device at a position corresponding to the position of the electronic pen over the blank page and touch board.

20 Claims, 7 Drawing Sheets

MULTIPURPOSE LEARNING DEVICE

CLAIM OF PRIORITY

This application makes reference to, incorporates the same herein, and claims all benefits accruing under 35 U.S.C. §119 from an application entitled Multipurpose Learning Devise earlier filed in the Korean Industrial Property Office on Jul. 16, 1997, and there duly assigned Ser. No. 97-32980 by that Office.

BACKGROUND OF THE INVENTION

1. Field of the Invention

The present invention relates to a multipurpose learning device, and more particularly, relates to a multipurpose learning device for reducing its size and weight by turning each page of a picture book having multimedia learning information upward and downward.

2. Background of the Related Art

Due to a technical improvement in electronics, many educational machines for toddlers and children have been developed. Especially, the latest trend is to develop machines that incorporate a displaying function to entice children's interest. As a result, the purpose of such machines can be better served by prolonging their interest in learning from each machine. Some examples of the purpose are to increase imaginative power, communicability, arithmetic ability, linguistic ability, color distinguishing ability and to raise moral and social consciousness.

In the present invention, the multipurpose learning device adapts multimedia technology to a conventional picture book which is using for intellectual development of toddlers and children. And this device has a function to output audio/video (A/V) signals through an A/V output unit, like a television, for children to watch the picture and listen to the sound of the book that they are reading.

Conventional picture books which are interactive with a television is described in U.S. Pat. No. 5,174,759 to Frank S. Preston et al. entitled TV Animation Interactively Controlled By The Viewer Through Input Above A Book Page and U.S. Pat. No. 5,749,735 to Peter M. Redford et al. entitled Interactive Book, Magazine And Audio/Video Compact Disk Box. Such devices allow a user to interact with the machine. For example, when a child selects a specific scene from a picture book, the child can see the corresponding picture and listen to the explanatory sound of the picture. Since such a device interestingly incorporates pictures of a picture book and A/V effects output through the television or any other A/V output units, the children can enhance their learning by actively interacting with such a device. Moreover, since lessons from the devices can be repeated as many times as children desire, the effect of education can be increased.

It is known that some conventional multipurpose learning device have many problems, as detailed below.

(1) In some interactive picture books, electronic pens are provided for the user to touch a picture to activate the interactive effects. After long-term use, each page of the picture book is easily injured by the electronic pen, so the conventional multipurpose learning device has the possibility of easy deformation of the pictures mainly associated with the long-term use by a user.

(2) The replacement of a information storing device is difficult because it is installed on a lower case of a main body of the interactive picture book, so a user may be required to disassemble the lower case of the main body for replacing the information storing device.

(3) The size of supporting body for the interactive picture book is large because the pages of the picture book are turned from side to side.

(4) The multipurpose learning device is too heavy to use for a toddler because the picture book and the supporting body are formed as a single module.

SUMMARY OF THE INVENTION

Therefore, it is an object of the present invention to prevent injury of the pages in the picture book which may be caused by the direct touch of an electronic pen.

It is another object of the present invention to reduce the size of the picture book and lighten the weight of the picture book.

It is still another object of the present invention to provide easy extensibility of the information storing device corresponding to the picture book.

According to the present invention, the pages of the picture book which is attached to the hinge-connected main body with the upper case and the lower case are formed in such a manner that the pages are turned to the hinged direction of the upper case and the lower case. Each front page of the picture book except a cover is a blank space, the electronic pen contacts and moves on the front page and each picture is drawn in each rear page of the picture book.

Moreover, the memory unit having the information storing device for storing learning information is detachably installed on the rear side of the touch board. In the one embodiment, a connecting protrusion which is formed on a memory unit and connecting groove which is formed on a support which is fixed to the rear side of the touch board are installed by mutually combining.

Moreover, the surface of the touch board or the surface of the lower case on which the touch board is installed is inclined to a predetermined angle.

BRIEF DESCRIPTION OF THE DRAWINGS

A more complete appreciation of the present invention, and may of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1:
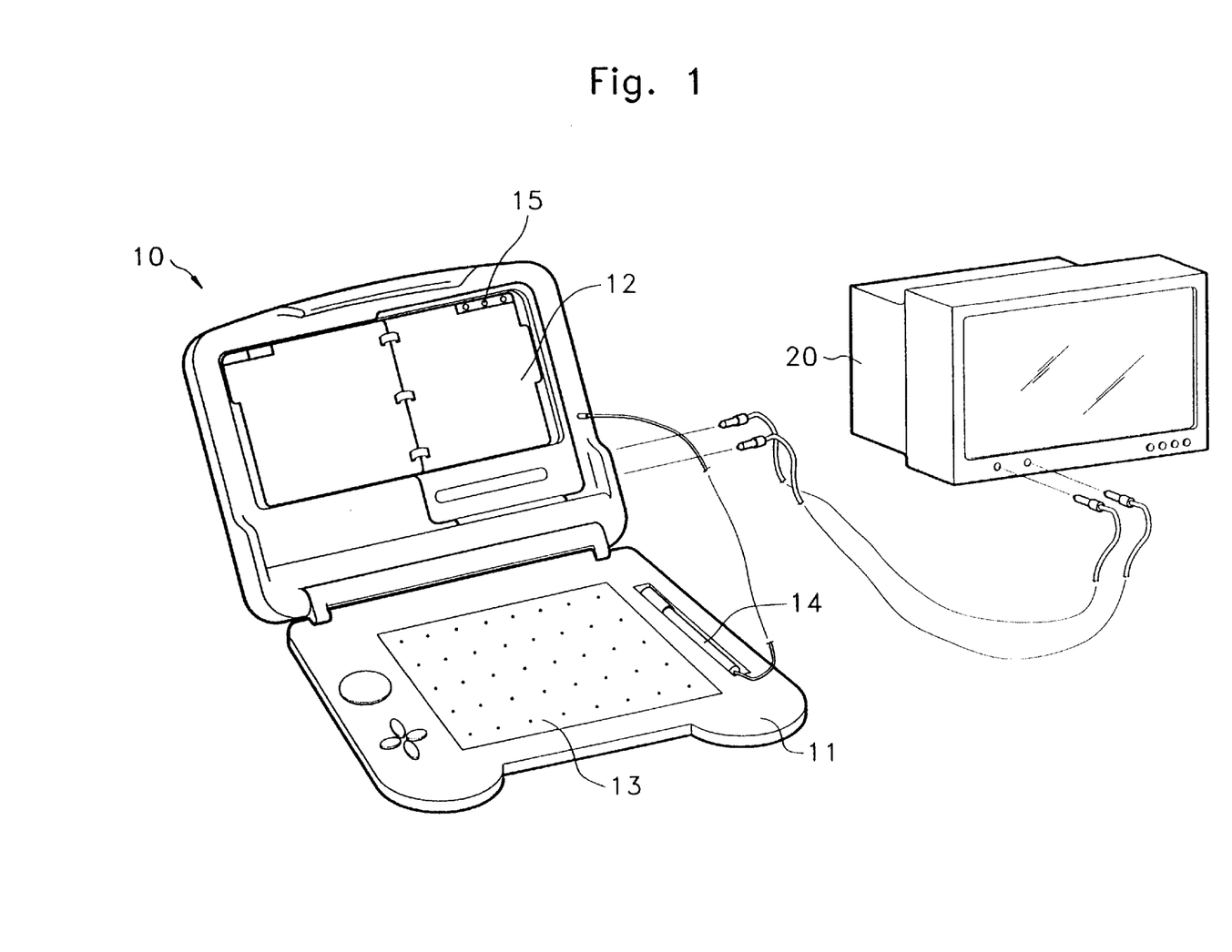
FIG. 1 is a perspective view schematically illustrating formation of an exemplary multipurpose learning device.
Figure 2:
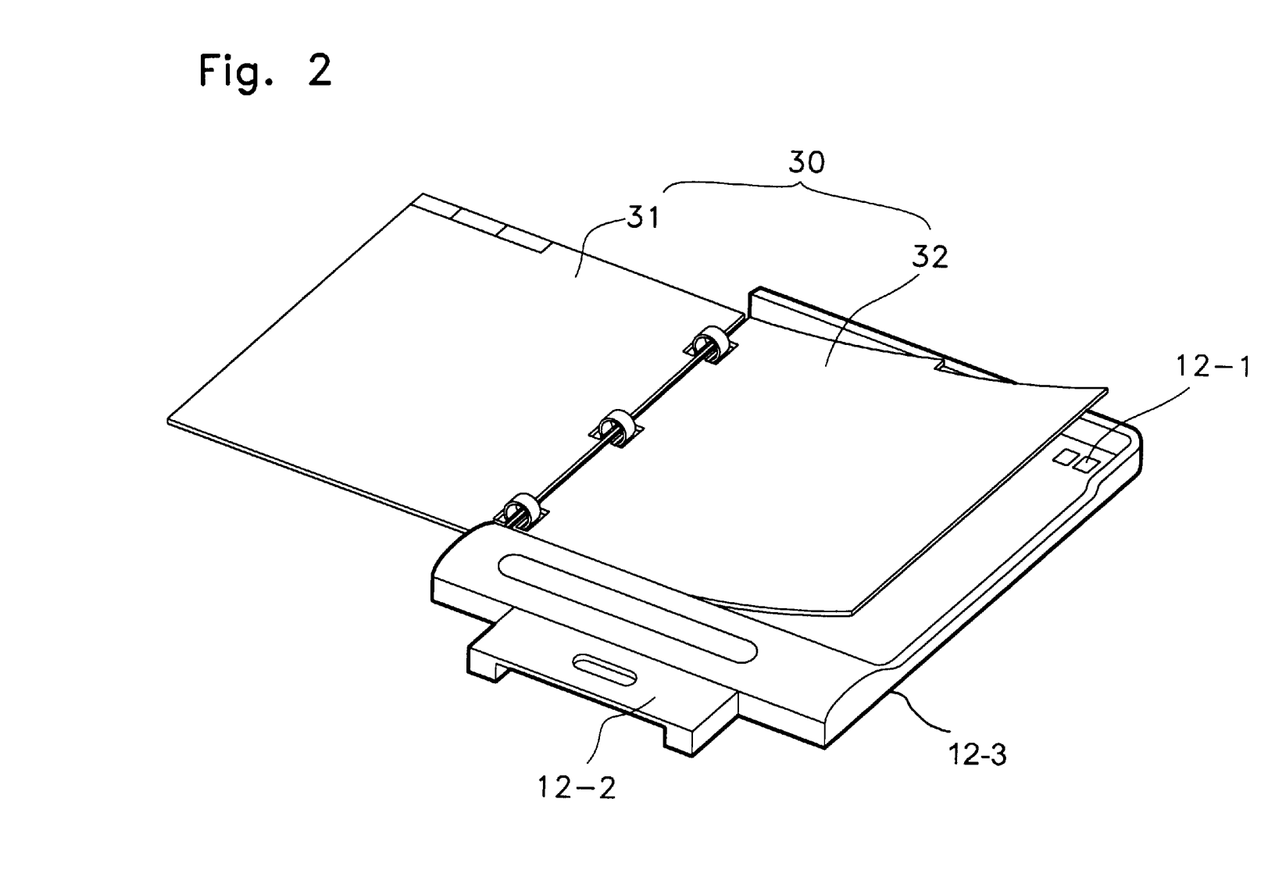
FIG. 2 is an outer perspective view of an exemplary picture book applied to the multipurpose learning device of FIG. 1.

FIG. 1 is a perspective view illustrating a formation of an exemplary multipurpose learning device corresponding to a pending patent application assigned to the assignee of the present patent application, and FIG. 2 is a visual perspective view of an exemplary picture book module which is applied to the multipurpose learning device of FIG. 1.

As shown in FIG. 1, the exemplary multipurpose learning device 10 is made of a main body 11 which has a lower case and an upper case which is combined with the lower case by a hinge and a picture book module 12 which is detachably fixed on the upper case.

The main body 11 includes a control device (not shown) for generally controlling the operation of the multipurpose learning device and an A/V output terminal for respectively outputting related audio and video representations of the picture book to an A/V output unit, respectively. Each A/V output terminal is respectively connected by an A/V cable to an A/V input terminal of the displaying device 20 and outputs voice and image corresponding to the predetermined picture.

Furthermore, main body 11 includes an electronic pen 14 for selecting a desirable picture to be seen and heard and a touch board 13 which senses the position of the electronic pen 14 and transmits the position of the electric pen 14 to the control device so that the user operates the multimedia learning device immediately.

Moreover, as shown in FIG. 2, the picture book module 12 includes a supporting body 12-3 and a picture book 30 which is received in the supporting body 12-3 and consists of a plurality of sheets 31 and 32 in which many pictures are drawn. An information storing device (not shown) having multimedia learning information which corresponds to each picture in the sheets 31 and 32 of the picture book 30, a page recognition sensor 12-1 for recognizing the page of the sheets 31 and 32 and a connector 12-2 for electronically connecting to the main body 11 are installed on the supporting body.

The operation of the above-mentioned exemplary multipurpose learning device will be described hereinafter. First, a selected picture book module 12 based on an interested subject by a user is inserted into an upper case of the main body 11. Afterward, when the main body 11 is supplied with power, the corresponding audio and video representations of the predetermined picture book module 12 are output to the A/V output unit 20, so a user can see the corresponding picture and listen to the explanatory sound of the picture.

In the mean time, as shown in FIG. 2, each sheet 31 and 32 of the picture book module 12 has an upper right portion which is cut proportionally to the number of the page and the page recognition sensors 12-1 for example light sensors are arranged in a row corresponding to the upper right portion on the supporting body 12-3. Therefore, when a user inserts the picture book module 12 into the corresponding space of the main body 11 and turns the first sheet, the page recognition sensor 12-1 corresponding to the right upper portion of the first sheet sense that the first page is opened. As a result, the controller determines a page of the current sheet referring to the sensor activated.

Consequently, when a user turns the sheets 31 and 32, the controller of the main body 11 reads the multimedia information which contains A/V signals from an information storing memory of the picture book module 12 corresponding to a current page and outputs the information to the A/V output unit 20, such as a television. Therefore, when the opened page is the first page, similar audio and video representations of the first page will be seen and heard through the television.

At this time, when a user touches a touch board 13 by using an electronic pen 14, a cursor appears in the A/V output unit corresponding to the position of a touch board 13 and moves depending on the movement of the electronic pen 14. Accordingly, a user can see the movement of the cursor and directly select a predetermined displayed picture button on which the cursor is located. Subsequently, when a user selects one picture button in the picture book by using the electric pen 14, the corresponding A/V representations can be seen and heard through the A/V output unit 20. For example, if a sun icon among the picture buttons is selected, the user can see the time varying images of the sun which is rising from the east and setting in the west and hear the explanatory sound related to the sun through the television.

Meanwhile, when a user turns to a next sheet, the screen of the A/V output unit 20 changes to a new screen which corresponds to a new picture of the newly turned sheets 31 and 32.

Since the information storing device of the picture book module 12 stores the image information and the audio information which are corresponding to each drawn sheet 31 and 32 of the picture book of a package unit, then a user only has to change the picture book module 12 to experience a different subject in the same manner as mentioned above.

Figure 3:
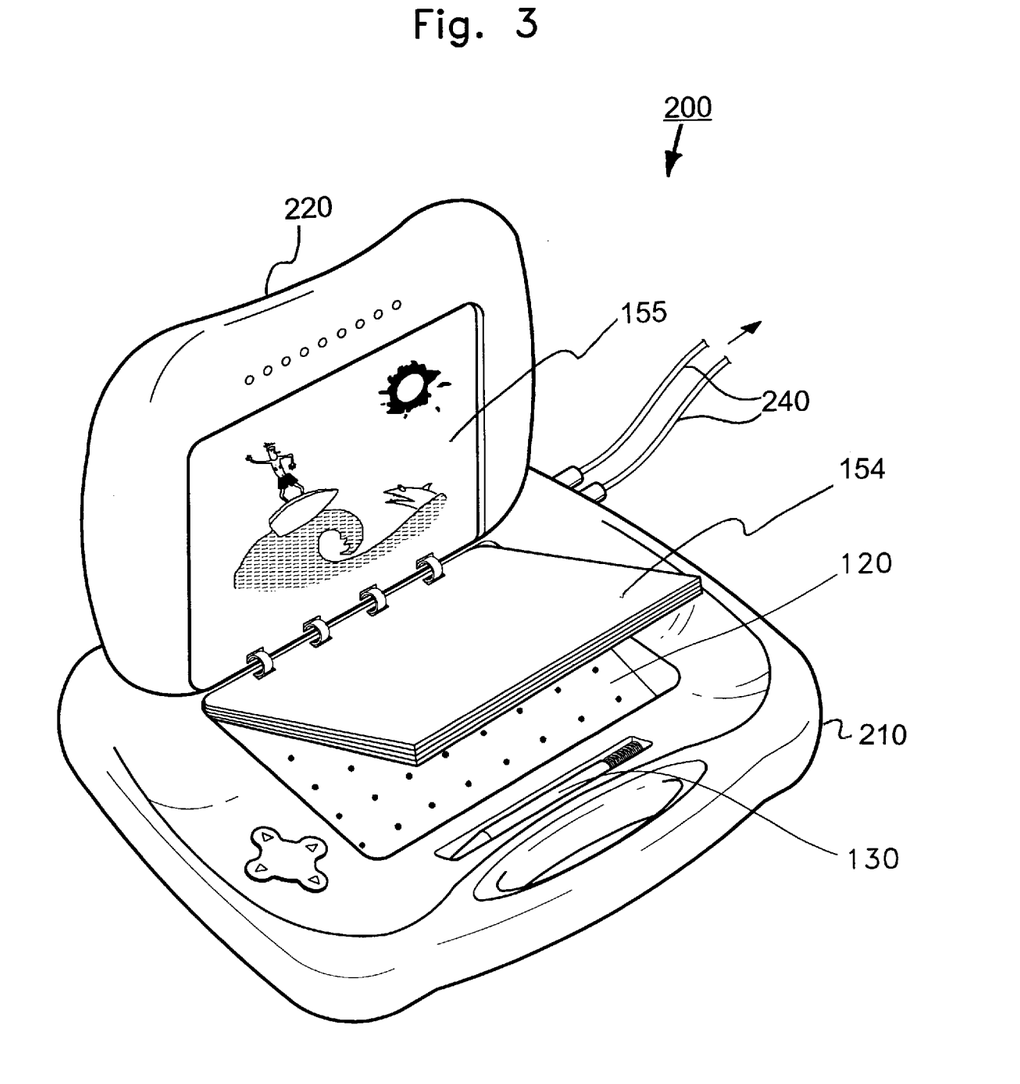
FIG. 3 is a perspective view illustrating an unfolded state of a multipurpose learning device according to the present invention.
Figure 4:
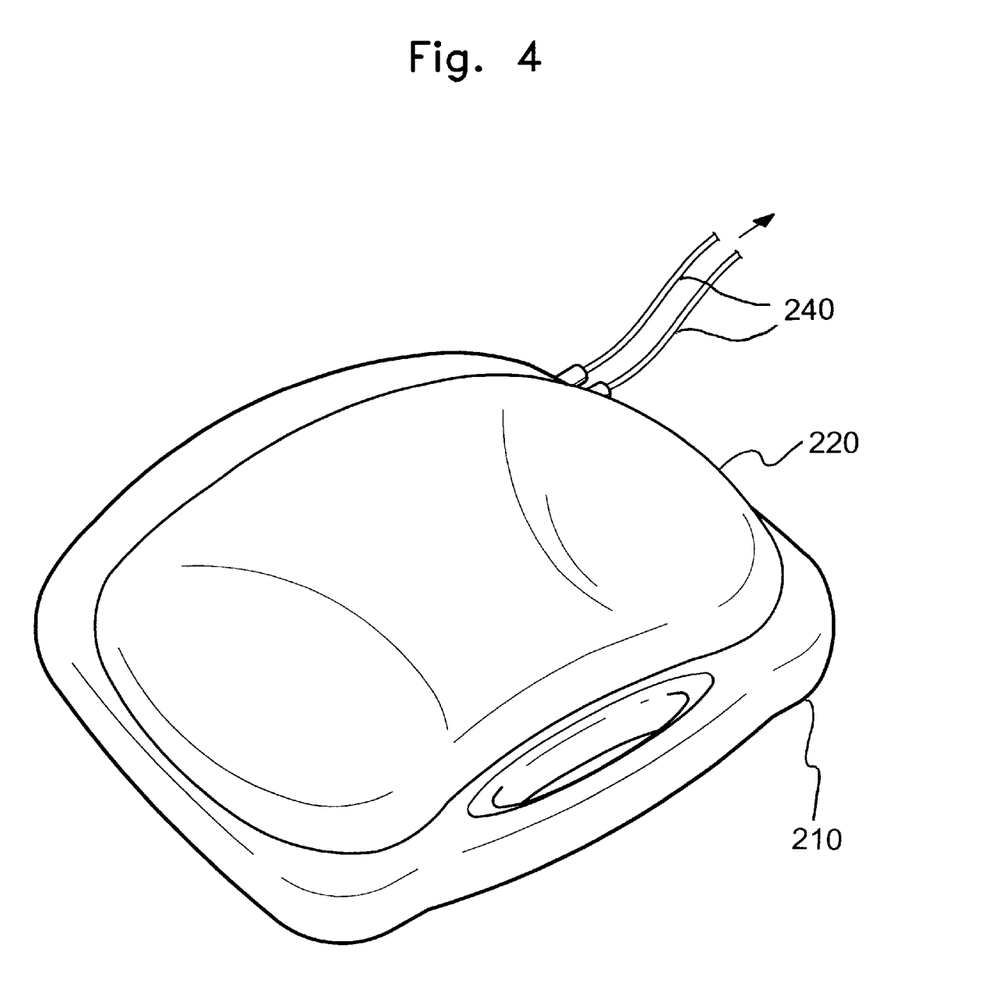
FIG. 4 is a perspective view illustrating a folded state of the multipurpose learning device according to the present invention.

The operation and characteristics of the present invention with referring to FIGS. 3 through 7 will be described in detail hereinafter. As shown in FIGS. 3 and 4, a multipurpose learning device according to the present invention includes a main body 200 having an upper case 220 and a lower case 210 which are hinge-connected, a picture book module 150 which is detachably connected through the lower case 210 and a control device 100 (FIG. 5) for controlling overall operation of the multipurpose learning device.

Receiving spaces (cavities) for receiving the picture book module 150 and an electronic pen 130 are formed in the upper and lower cases 220 and 210 such that picture book module 150 is received in both the upper and lower cases 220 and 210 and electronic pen 130 is received in the lower case 210. Also shown are A/V cables 240 extending from lower case 210.

Figure 6:
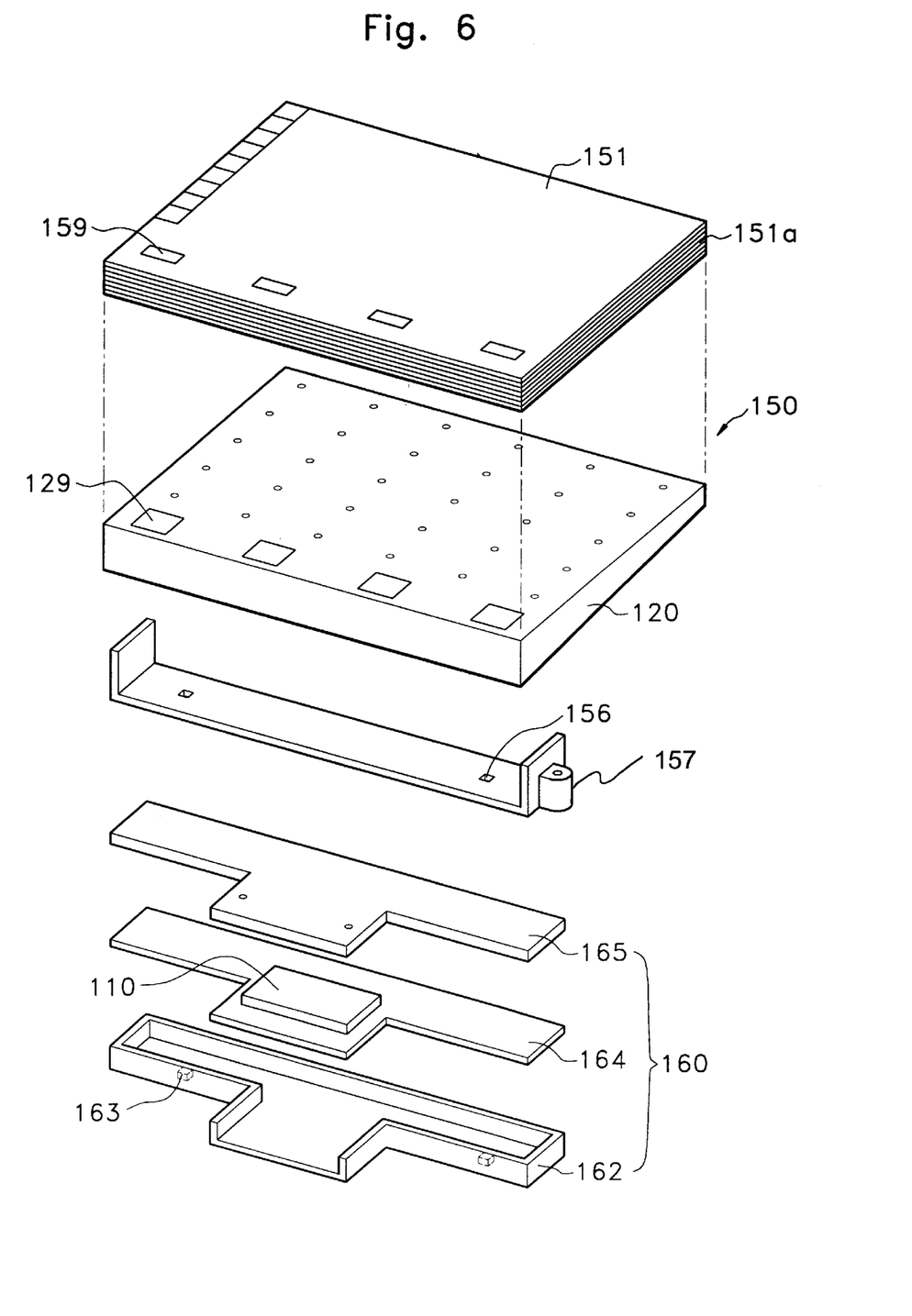
FIG. 6 is an exploded perspective view of a picture book module applied to the multipurpose learning device according to the present invention.

Referring to FIG. 6, a picture book module 150 includes a picture book 151, a touch board 120 for receiving picture book 151, and a memory unit 160 which is detachably attached to the touch board 120. The picture book 151 has a plurality of sheets 151a and the sheets 151a are unfolded to a hinged direction of the upper case and the lower case. Openings 159 are formed through the sheets 151a to enable the sheets 151a to be hingely attached to touch board 120 at corresponding hinge connection points 129 formed perforating the touch board 120.

An upper surface of the touch board 120 is declined to a predetermined angle toward the lower surface, and preferably the predetermined angle is 35° or less. By having a slant in the touch board 120, when a user touches the touch board 120 using the electronic pen 130, a user may easily use the multipurpose learning device in the point of ergonomic engineering.

The memory unit 160 includes a printed circuit board (PCB) 164 which an information storing device, for example, a ROM 110 is mounted thereon, a lower receiving unit 162 for receiving the PCB 164 and an upper cover 165. The memory unit 160 is installed on the touch board 120 by using a support 157 in such a manner that a connecting protrusion 163 which is formed on the bottom side of the lower receiving unit 162 and a connecting groove 156 which is formed on the inside of support 157 are mutually connected and installed.

Figure 5:
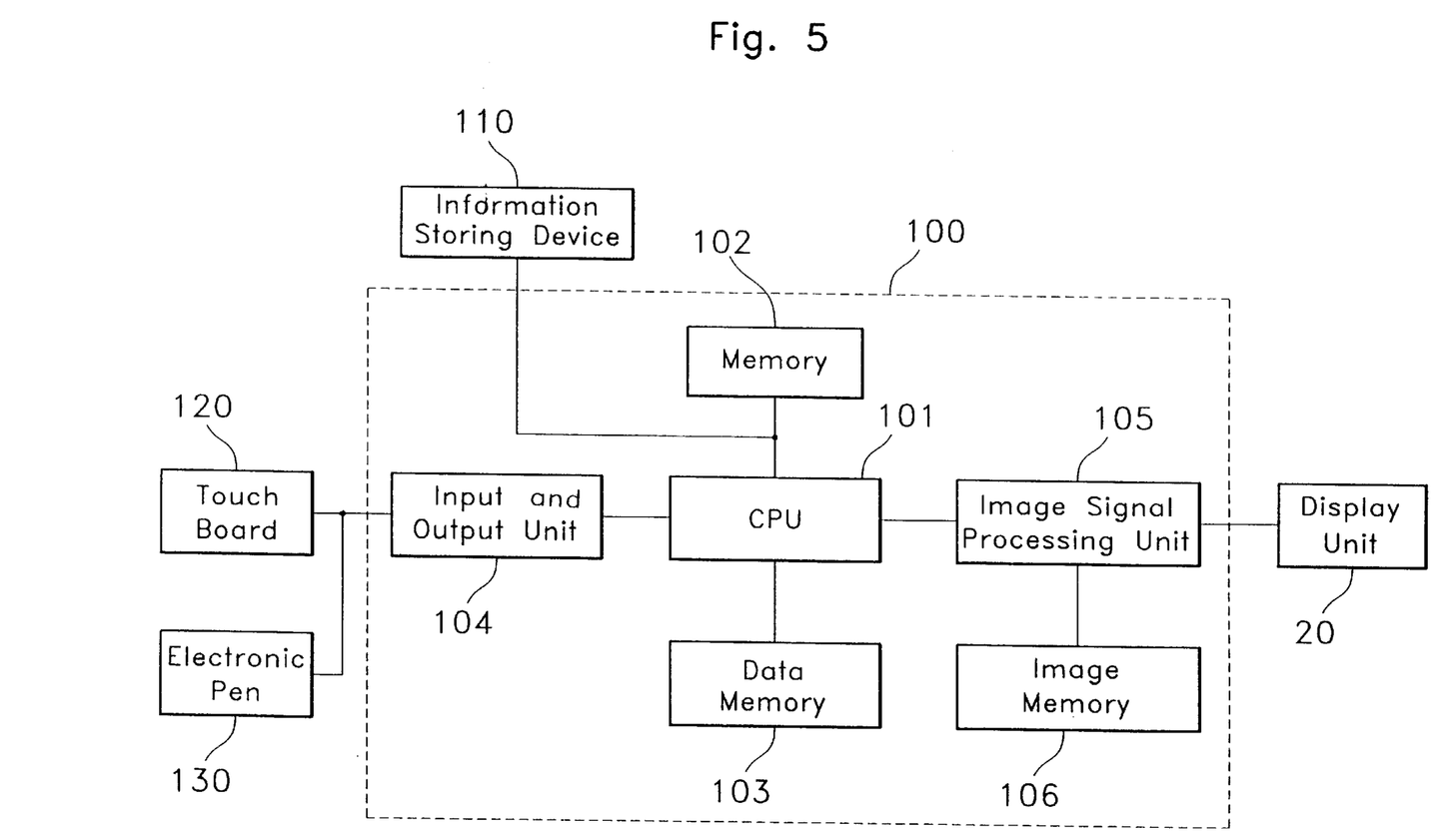
FIG. 5 is an operational block diagram of the multipurpose learning device according to the present invention.

Referring to FIG. 5, a control device 100 of the multipurpose learning device includes: an input and output unit 104 for inputting and outputting the electric signals related to the position of the electronic pen 130 which is touched by a user on the touch board 120; a memory 102 for storing a device program; a data memory 103 for storing temporary data which is generated during executing the device program; a central processing unit 101 for controlling overall device by reading the multimedia learning information from the information storing device such as a ROM 110 according to the signals of the input and output unit 104 and processing the multimedia learning information; an image signal processing unit 105 for converting the multimedia learning information to image data by controlling the central processing unit 101 and an image memory 106 for storing processed image data.

The usage of the multipurpose learning device, having above mentioned structure, will be described hereinafter.

First, the PCB 164 equipped with the ROM 110 is installed on the lower receiving unit 162 and the upper cover 165 is combined with the lower receiving unit 162 by using a screw. And, the support 157 is fixed to the rear side of the touch board 120 by using a screw and the memory unit 160 is inserted between the support 157 and the touch board 120. Accordingly as aforementioned, the connecting protrusion 163 formed on the bottom side of the lower receiving unit 162 of the memory unit 160 and the connecting groove 156 which is formed on the support 157 are mutually connected and installed.

The memory unit 160 and the touch board 120, connected as aforementioned manner, are installed on the lower case 210, then, the PCB 164 is combined with a connector(not shown) which is formed on the lower case 210 and electrically connected thereto.

Then, the picture book module 151 is installed on the touch board 120.

When the installation is finished and the electric power is supplied to the multipurpose learning device, an image of the first sheet of the picture book module 151, in other word, an image of a cover is displayed as an initial image in the display unit 20.

Figure 7:
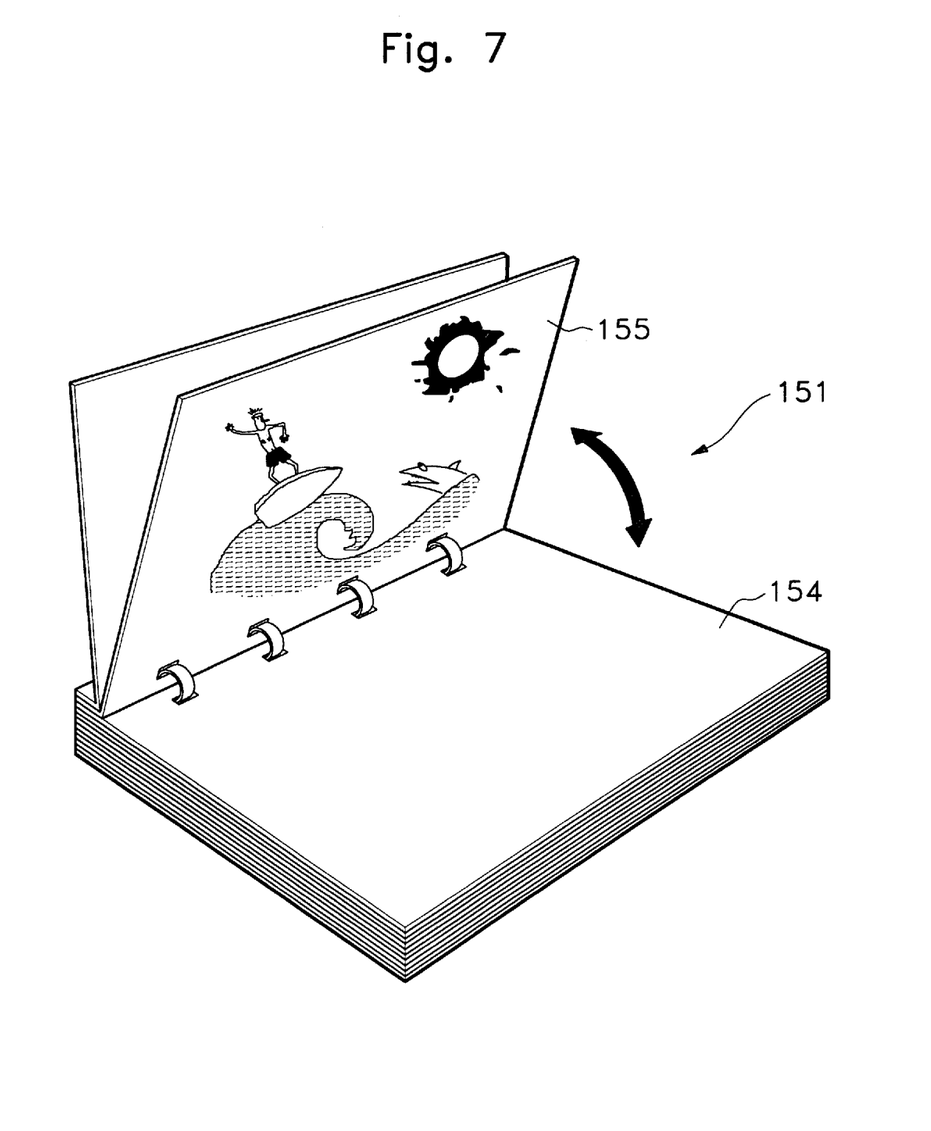
FIG. 7 is a perspective view illustrating an unfolded state of the picture book.

Referring to FIG. 7, one side 154 of each sheet of the picture book 151a except a cover is a blank space, i.e., a blank page, and pictures are drawn on the other side 155, i.e., a picture page, of each sheet of the picture book. And there may be a plurality of picture buttons (not shown) corresponding to the learning information among the pictures and corresponding to pictures buttons which will be displayed on display unit 20. Accordingly, when a user turns the first sheet, the image corresponding to the picture which is drawn on side 155 of the first sheet is displayed on the display unit 20. Here, the page sensing method is the same as compared to the exemplary multipurpose learning device of FIG. 1.

At this time, when a user touches the blank side 154 of a sheet now turned down over touch board 120, with the electronic pen 130, a cursor appears on the screen of display unit 20 at a position corresponding to the position of the electronic pen 130 above touch board 120, and the cursor moves depending on the movement of the electronic pen 130. Accordingly, a user can see the movement of the cursor on display unit 20 and directly select a predetermined picture button by positioning the curser on one of the displayed picture buttons.

A user may select a picture button, by magnetically exchanging signals between the touch board 120 and the electronic pen 130, and the multimedia learning information which consists of the related voice and image data is sequentially displayed in the screen of the display unit 20. A television set is generally used for the display unit 20 and it is also equipped with a monitor for displaying the image signal and a speaker for outputting the audio signal from the multipurpose learning device.

In the mean time, the electronic pen 130 can be more exact in its operation if the surface of the touch board 120 and the axis of electronic pen 130 are as perpendicular as possible to each other. Typically, a user uses the electronic pen 130 like gripping a pencil, and using the electronic pen 130 perpendicular to the touch board 120 is difficult for a user. According to the present invention, the surface of the touch board 120 is declined to a predetermined angle in the present invention for enabling the user to hold electronic pen 130 perpendicular to touch board 120. Preferably, the declined angle for the surface of the touch board 120 is 35° or less. In the preferred embodiment, the surface of the touch board 120 is declined but it is also possible to decline the lower case or the cavity of the lower case in which the touch board is disposed, instead. As aforementioned, a user may ergonomically use the electronic pen 130 and additionally, the operation of the electronic pen 130 is exactly executed.

Moreover, according to the present invention, the size of the multipurpose learning device is reduced to about half the size of the exemplary device by unfolding sheets 151a of the picture book module to a hinged direction of the upper case and the lower case. That is, the sheets are turned downward from upper case 220 and positioned over touch board 120 in lower case 210. Alternatively, the sheets are turned upward from power case 210 and positioned in the receiving area of upper case 220. Additionally, the sheets are thin and are limited to a predetermined number so that the combined thickness of the sheets, minus the cover, is less than a predetermined limit corresponding to the sensitivity of the electronic pen 130 and touch board 120. That is, the more sensitive the thicker the book can be. For example, the sheets may be 0.17 mm thick and limited to 10 total sheets. Accordingly, a toddler, a main user of the multipurpose learning device, can easily use the multipurpose learning device with its lightened weight.

Moreover, a user contacts and moves the electronic pen over the blank side 154 of the picture book sheet and the pictures drawn on the other side 155 are not affected and are prevented from being damaged.

A user may exchange the ROM 110 of the memory unit 160 for updating the learning information to a new version, and the exchanging operation of the ROM 110 of the memory unit 160 is easy because a user may only take out and exchange the memory unit 160.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A multipurpose learning device, comprising:
   a main body having an upper case and a lower case which are hinge-connected;
   a picture book module received to said main body; and
   an electronic pen for selecting learning information from said picture book module,
   wherein said picture book module includes:
      a picture book including a plurality of sheets for unfolding to a hinged direction of said upper and said lower cases;
      a memory unit for storing multimedia learning information corresponding to said picture book; and
      a touch board for sensing movement of said electronic pen over a page of said picture book, said page being installed on a surface of said touch board and wherein said memory unit is detachably connected on the rear side of said picture book module.

2. The multipurpose learning device according to claim 1, each front page of said picture book except a cover is a blank space and each rear page of said picture book has a plurality of drawn pictures.

3. The multimedia learning device according to claim 1, said memory unit comprising:
   a printed circuit board having an information storing device which stores said learning information;
   a lower receiving unit which said printed circuit board is received therein and a connecting protrusion is formed in the rear side thereof; and
   an upper cover combined with said lower receiving unit.

4. The multipurpose learning device according to claim 3, a support having a connecting groove is fixed on the rear side of said touch board and said memory unit is installed on said touch board by combining said connecting protrusion with the connecting groove of said support.

5. The multipurpose learning device according to claim 3, said information storing device is a ROM.

6. The multipurpose learning device according to claim 1, the front surface of said touch board is declined to a predetermined angle.

7. The multipurpose learning device according to claim 6, said predetermined angle is 35° or less.

8. The multipurpose learning device according to claim 1, the front surface of the lower case corresponding to said touch board is declined to a predetermined angle.

9. The multipurpose learning device according to claim 8, said predetermined angle is 35° or less.

10. A multipurpose learning device, comprising:
    a main body having an upper case and a lower case which are hinge-connected;
    a picture book module electronically connectable to said lower case, said lower case having a first cavity for receiving said picture book module, wherein said picture book module comprises:
       a picture book including a plurality of pages, said pages being movable between said first cavity of said lower case and a second cavity in said upper case;
       a memory unit including a printed circuit board and a memory installed on said printed circuit board; and
       a touch board for sensing movement of an electronic pen over one of said pages in said picture book, wherein said picture book is hingedly attached to said touch board and said memory unit is detachably connected to a portion of said touch board;
    audio/video output means for providing audio and video information, respectively corresponding to audio and video data stored in said memory, to a host for enabling said host to output sound corresponding to said audio information and display images corresponding to said video information, said video information corresponding to pictures in said picture book; and
    an electronic pen movable over said page of said picture book for producing a cursor on a display screen of said host at a position corresponding to a position of said electronic pen over said page, said lower case having a third cavity for receiving said electronic pen when said electronic pen is not in use.

11. The multipurpose learning device according to claim 10, wherein said pages of said picture book except a cover have a blank side and a picture side, wherein said picture side comprises pictures corresponding to said video information.

12. The multipurpose learning device according to claim 11, wherein a user moves said electronic pen over a blank side of one of said pages positioned over said touch board in said first cavity of said lower case and a picture side of another of said pages faces said user from said second cavity of said upper case, while an image corresponding to said picture side of said another of said pages is displayed on said display screen of said host.

13. The multimedia learning device according to claim 10, said memory unit further comprises:
    a lower receiving unit in which said printed circuit board is received, said lower receiving unit comprising a connecting protrusion extending from a bottom outer surface of said lower receiving unit; and
    an upper cover for covering said printed circuit board received in said lower receiving unit.

14. The multipurpose learning device according to claim 13, said picture book module further comprising a support, having a connecting groove, fixedly attached to said touch board, said connecting protrusion of said memory unit being connectable to said connecting groove of said support.

15. The multipurpose learning device according to claim 10, wherein said memory comprises a read only memory.

16. The multipurpose learning device according to claim 10, wherein a forward portion of said touch board is lower than a rearward portion enabling a surface of said touch board to be declined at a predetermined angle within said first cavity.

17. The multipurpose learning device according to claim 16, wherein said predetermined angle is 35° or less.

18. The multipurpose learning device according to claim 10, wherein a rearward portion of said lower case is higher than a forward portion of said lower case enabling a surface of said touch board to decline at a predetermined angle.

19. The multipurpose learning device according to claim 18, wherein said predetermined angle is 35° or less.

20. The multipurpose learning device according to claim 10, wherein said first cavity is sloped at a predetermined angle for enabling said touch board to decline at a predetermined angle.

* * * * *